United States Patent [19]

Bond, Jr. et al.

[11] 4,028,483

[45] June 7, 1977

[54] EPDM INTERPOLYMERS FORMED WITH UNSATURATED ORGANOSILANES

[75] Inventors: William C. Bond, Jr.; Harold J. Wahlborg, both of Baton Rouge, La.

[73] Assignee: Copolymer Rubber & Chemical Corporation, Baton Rouge, La.

[22] Filed: Sept. 8, 1975

[21] Appl. No.: 610,987

Related U.S. Application Data

[63] Continuation-in-part of Ser. No. 592,381, July 2, 1975, abandoned, which is a continuation-in-part of Ser. No. 340,221, March 21, 1973, abandoned, which is a continuation of Ser. No. 102,929, Dec. 30, 1970, abandoned.

[52] U.S. Cl. .................. 526/279; 260/23.7 M; 260/42.33; 260/45.85 R; 260/79.5 B; 260/448.2 N; 260/448.2 H; 260/448.2 Q; 260/827; 260/897 A; 526/17; 526/143; 526/916

[51] Int. Cl.² .............. C08F 30/08; C08F 130/08; C08F 15/40; C08F 4/44

[58] Field of Search ............ 260/448.2 N, 448.2 H, 260/448.2 Q; 526/279

[56] References Cited

UNITED STATES PATENTS

| | | | |
|---|---|---|---|
| 2,847,409 | 8/1958 | DeBenneville et al. | 260/89.7 |
| 3,240,768 | 3/1966 | Guenther | 260/88.1 |
| 3,375,236 | 3/1968 | Van de Castle et al. | 260/80.71 |
| 3,577,399 | 5/1971 | Mortimer | 260/88.1 |
| 3,644,306 | 2/1972 | Longi et al. | 260/80.71 |

*Primary Examiner* — Joseph L. Schofer
*Assistant Examiner* — Herbert J. Lilling
*Attorney, Agent, or Firm* — McDougall, Hersh & Scott

[57] ABSTRACT

An interpolymer of ethylene, a monoolefin containing from 3–20 carbon atoms, a polyene, and an unsaturated organosilane in which the interpolymer is prepared by interpolymerization reaction in the presence of a Ziegler type catalyst.

16 Claims, No Drawings

EPDM INTERPOLYMERS FORMED WITH UNSATURATED ORGANOSILANES

This is a continuation-in-part of our application Ser. No. 592,381 filed July 2, 1975, now abandoned, which in turn is a continuation-in-part of application Ser. No. 340,221, filed Mar. 21, 1973, now abandoned, which was a continuation of the then copending application Ser. No. 102,929, filed Dec. 30, 1970, and now abandoned.

This invention relates to new and improved ethylene interpolymers and to methods for the preparation of same and more particularly to the preparation of new and improved vulcanizable ethylene interpolymers having a number of unique properties and characteristics.

It is an object of this invention to produce and to provide a method for producing interpolymers of ethylene and preferably vulcanizable EPM or EPDM type interpolymers having improved physical and mechanical properties, particularly when compounded with certain mineral fillers, as well as a number of other novel characteristics.

The interpolymers of this invention are prepared by the interpolymerization of a first monomeric component in the form of ethylene, and a second monomeric component in the form of an unsaturated organo silane having the general formula $R_nSiX_{4-n}$ in which X is a highly hydrolyzable group other than an oxygen containing group, as represented by a halogen such as chlorine, bromine or iodine, a tertiary amino group, and the like, R is a group selected from the group consisting of hydrogen, an organic aliphatic group such as methyl, ethyl, propyl, isopropyl, butyl, amyl, hexyl, octadecyl, and the like, an organic alicyclic group such as cyclopentyl, cyclohexyl and the like, an aryl or alkaryl group such as phenyl, mono- and polyalkyl phenyls such as tolyl, xylyl, mesitylyl, mono-, di- and triethyl phenyls, naphthyl, mono- and polyalkyl naphthyls such as methyl naphthyl, diethyl naphthyl, etc., and anthracyl, and aralkyl group such as benzyl, 2-phenylethyl, and the like, a heterocyclic radical, and in which at least one of the R groups is an organic. group having at least one carbon-to-carbon double bond, such as allyl, vinyl and the like, and in which the unsaturated organic group is preferably a norbornenyl or alkyl substituted norbornenyl group, and in which said groups may be substituted or unsubstituted, halogen substituted or unsubstituted, and in which $n$ is a number of from 1 to 3. If desired a third monomeric component in the form of monoolefins, preferably an alpha-monoolefin containing from 3 to 20 carbon atoms, and preferably 3 to 10 carbon atoms, as represented by the preferred component propylene, may be included. If desired a fourth monomeric component in the form of a polyene may also be included.

The silicon containing compounds as mentioned above are usually called unsaturated organosilanes but they can also be called silyl substituted olefins depending on the complexity of the organic substituents on the silicon atom. It will be noted later that the nomenclature will follow the organosilane precedent when discussing simple olefins but when specific norbornene compounds are mentioned the silylorganic type nomenclature has been used.

It will be understood that the second monomer may comprise one or a mixture of unsaturated organosilanes of the type described and that the third monomeric component may be formed of one or more olefins having from 3 to 20 carbon atoms and that the fourth monomer in the form of a polyene may constitute one or a number of polyenes of the types which will hereinafter be described in greater detail.

The second monomeric or group of monomeric compounds, identified as an unsaturated organosilane, may be represented by the general formula $R_nSiX_{4-n}$ in which $n$ is a number from 1 to 3, X is a highly hydrolyzable group such as a halogen group, a tertiary amino group and the like, and R is hydrogen or an organic group as previously described, in which at least one of the R groups is an organic group containing one or more olefinic groups, in which the second monomer may be represented by such compounds as vinyltrichlorosilane, allyl-trichlorosilane, vinyldichlorosilane, allylmethyldichlorosilane, allyldimethylchlorosilane and the like; an unsaturated aryl or alkaryl silane such as styryltrichlorosilane and the like, but it is preferred to make use of a silane in which an unsaturated organo group on the silicon atom is a norbornenyl group as represented by 5-trichlorosilyl-2-norbornene, 5-methyldichlorosilyl-2-norbornene, 5-dimethylchlorosilyl-2-norbornene, 6-methyl-5-trichlorosilyl-2-norbornene, 7-methyl-5-trichlorosilyl-2-norbornene, 5-methylene-trichlorosilyl-2-norbornene, 5-phenyldichlorosilyl-2-norbornene, 5-tribromosilyl-2-norbornene, 6-chloro-5-trichlorosilyl-2-norbornene and 5,6-bis(trichlorosilyl)-2-norbornene.

The third monomeric component can be an alpha-olefin having from 3 to 20 carbon atoms and may be represented by the general formula $R — CH = CH_2$, wherein R is a $C_1$ to $C_{18}$ alkyl radical which may be branched or straight chained, halogen substituted or unsubstituted, and which may be represented by the compounds propylene, 1-butene, 1-pentene, 1-hexene, 1-heptene, 1-octene 1-nonene, 1-decene, 4-methyl-1-pentene, 4-methyl-1-hexene, 4,4-dimethyl-1-pentene, 5-methyl-1-heptene, 6-methyl-1-heptene, etc. The third monomeric component may also be a mono-unsaturated bridged ring hydrocarbon or halogenated bridged ring hydrocarbon such as the derivatives of bicyclo (2,2,1) heptene. Specific examples of preferred bridged ring compounds of this type are norbornene, 5-chloro-2-norbornene, 7,7-dimethyl-2-norbornene, 5-ethyl-2-norbornene and the like.

The polyene or other ethylenically unsaturated compound containing a plurality of carbon-to-carbon double bonds may be an open chain polyunsaturated hydrocarbon containing 4 to 20 carbon atoms, such as 1,4-hexadiene, monocyclic polyenes and polycyclic polyenes, but it is preferred to make use of a polyunsaturated bridged ring hydrocarbon or halogenated bridged ring hydrocarbon, such as the polyunsaturated derivatives of bicyclo (2,2,1) heptane wherein at least one of the double bonds is present in one of the bridged rings, such as dicyclopentadiene, bicyclo (2,2,1) hepta-2,5-diene, or alkylidene norbornenes and preferably a 5-alkylidene-2-norbornene wherein the alkylidene group contains from 1 to 20 carbon atoms and preferably 1 to 8 carbon atoms, or the alkenyl norbornenes, and preferably the 5-alkenyl-2-norbornenes wherein the alkenyl group contains from 3 to 20 carbon atoms and preferably from 3 to 10 carbon atoms. Other bridged ring hydrocarbons include polyunsaturated derivatives of bicyclo (2,2,2) octane, as represented by bicyclo (2,2,2) octa-2,5-diene, polyunsaturated derivatives of bicyclo (3,2,1) octane, polyunsaturated derivatives of bicyclo (3,3,1) nonane. At least one double bond is present in the bridged ring of the above compounds and at least one other double bond is present in a bridged ring or in a side chain. Specific examples of preferred bridged ring compounds of the type described above include 5-methylene-2-norbornene, 5-ethylidene-2-norbornene, 5-n-propylidene-2-norbornene, 5-isopropylidene-2-norbornene, 5-n-butylidene-2-norbornene, 5-isobutylidene-2-norbornene, dicyclopentadiene, 5-(2-methyl-2-butenyl)-2-norbornene, 5-(3-methyl-2-butenyl)-2-norbornene and 5-(3,5-dimethyl-4-hexenyl)-2-norbornene. The interpolymer prepared from 5-ethylidene-2-norbornene is greatly preferred since the combination which makes use thereof has outstanding properties and it appears to be somewhat unique by reference to the others.

The fourth monomeric component, the polyene or substituted polyene, may be chemically bound in the interpolymer in an amount within the range of 0.1 to 10 mole percent, and preferably 0.1 to 3 mole percent, or in an amount to provide an actual or calculated unsaturation level of at least two double bonds per 1,000 carbon atoms of the interpolymer chain. However, amounts to provide much higher unsaturation levels are preferred, such as levels of up to 100 double bonds per 1,000 carbon atoms in the interpolymer, and preferably an amount to provide from 2.5 to 30 double bonds per 1,000 carbon atoms, and more preferably 2.5 to 15 double bonds per 1,000 carbon atoms. The specific unsaturation level selected to be introduced by the polyene component will vary depending upon the properties desired in the elastomeric interpolymer that is formed.

The unsaturated organo silane, or second monomer, is employed in the reaction mixture in an amount within the range of more than 0.01 percent but less than 1 percent by weight and preferably in an amount within the range of 0.05 to 0.50 percent by weight of the total monomer system.

Since the allyl and vinyl and the like unsaturated aliphatic halo silanes are slow in the reaction by comparison with the norbornenyl silanes and are less competitive from the standpoint of reactivity by comparison with the other three monomeric components, more of the aliphatic unsaturated silanes is used, but only a fraction, such as 1/100 to 1/10 of the monomer, it is believed, enters into the polymer backbone. On the other hand, the norbornenyl or modified norbornenyl silanes are sufficiently reactive to compete more favorably with the other monomeric components and therefore are preferred for use as the second monomer.

As the second monomer, it is undesirable to make use of an unsaturated silane in which the highly hydrolyzable groups are in the form of an alkoxy or primary or secondary amino groups, such as methoxy or ethoxy or NHR groups, since such oxygen and nitrogen containing groups tend to kill the catalyst and thus destroy the reactivity necessary for interpolymerization of the monomers. In addition, when use is made of unsaturated silanes having highly hydrolyzable halogen or tertiary amino groups as the hydrolyzable groups on the unsaturated silane, such groups can be retained by the fourth monomer during interpolymerization with the other monomers to become a part of the backbone of the interpolymer and thereby offer a large number of unique and interesting ramifications from the standpoint of reactions and products that may be achieved from the formed interpolymer. As a result, new and unique compounds are capable of being produced which have a number of novel applications.

The interpolymerization of the monomeric components described can be carried out in solution in an inert organic solvent, in the presence of a Ziegler type catalyst, all of which will hereinafter be described.

In the interpolymer of the invention, it is preferred to make use of the first monomer ethylene and the third monomeric component propylene or other $C_3$ to $C_{20}$ monoolefin for copolymerization in the interpolymer in the ratio of 20–95 moles of ethylene to 80–5 moles of the third monomeric component and preferably within the range of 45–90 moles of ethylene to 55–10 moles of propylene, or other third monomeric component.

The polymerization solvent may be any suitable inert organic solvent which is liquid under the reduction conditions such as any prior art solvent useful for solution polymerization of monoolefins in the presence of Ziegler type catalysts. Examples of satisfactory hydrocarbon solvents include acyclic paraffins and olefins containing 3 to 8 carbon atoms, and preferably hexane; aromatic hydrocarbons and preferably aromatic hydrocarbons containing a single benzene nucleus such as benzene, toluene and the like; saturated cyclic hydrocarbons which have a boiling point range approximating that for the straight chain paraffin hydrocarbon and aromatic hydrocarbons discussed above, and preferably saturated cyclic hydrocarbons containing 5 or 6 ring carbon atoms; chlorinated hydrocarbons such as carbon tetrachloride, chlorobenzene and tetrachloroethylene. The solvent may be a mixture of one or more of the foregoing hydrocarbons, such as a mixture of aliphatic and naphthenic hydrocarbons, preferably having approximately the same boiling range as normal hexane. It is important for the solvent to be dry and free of substances which will interfere with the Ziegler catalyst to be used in the polymerization process.

Ziegler catalysts, as described in the prior art may be employed. Such Ziegler catalysts are disclosed in a large number of patents, such as U.S. Pat. Nos. 2,933,480, 3,093,620, 3,093,621, 3,211,709 and No. 3,113,115. Such Ziegler catalysts generally include metal organic coordination catalysts prepared by contacting a compound of a heavy metal of the groups IV-b to VII-b of the Mendelejeff periodic system of elements, such as titanium, vanadium and chromium halides with an organo-metallic compound of a metal of Groups I to III of the Mendelejeff periodic system which contains at least one carbon-metal bond, such as trialkyl aluminum and alkyl aluminum halides wherein the alkyl groups contain from 1 to 20 and preferably 1 to 4 carbon atoms.

The preferred Ziegler catalyst for the described polymerization is prepared from a vanadium compound and alkyl aluminum halide such as vanadium trichloride, vanadium tetrachloride, vanadium oxychloride, vanadium acetylacetonate, etc., and alkyl aluminum chloride activators having the general formula $R_1AlCl_2$ and $R_2AlCl$, and the corresponding seaquichlorides having the general formula $R_3Al_2Cl_3$ in which R is methyl, ethyl, propyl, butyl, or isobutyl. In the catalytic system, the aluminum to vanadium mole ratio of the aluminum and vanadium compounds may be within the range of 5–200:1 and preferably within the range of 15–60:1. A catalyst prepared of alkyl aluminum sesquichloride, such as methyl or ethyl aluminum sesquichloride, and vanadium oxychloride is preferred, with the preferred ratio of 1 mole vanadium oxychloride for 5–200 moles of aluminum and preferably for each 15-60 moles of aluminum.

Generally the polymerization reaction may be carried out in a temperature range of −40° to 150° C. and preferably within a temperature range of 0° to 60° C. during the course of the reaction. The polymerization reaction may be carried out at substantially atmospheric pressure but pressures up to 1,000 psi may be employed.

The polymerization is preferably carried out on a continuous basis in a dry reaction vessel which is closed to the outside atmosphere and which is provided with means for agitation, reactor cooling means, and inlets and outlets for continuously supplying the ingredients of the reaction mixture including the monomer and catalyst, and for continuously withdrawing the solution of elastomer. The polymerization is carried out in a liquid phase in the organic solvent in the presence of the Ziegler catalyst and the solution of elastomer in the polymerization solvent is withdrawn continuously from the reaction vessel and the catalyst is killed by a catalyst deactivator, such as water, or other aqueous solution, or alcoholic solution.

The interpolymers of the invention may be cured in accordance with prior art procedures. As a general rule, a curing procedure which is normally followed in curing unsaturated hydrocarbon rubbers, such as styrene-butadiene rubber, natural rubber, polybutadiene rubber, synthetic polyisoprene rubbers and the like, will be unsatisfactory. Use may be made of various curing agents in effecting the rapid cure of the interpolymer.

Vulcanization may be achieved with the use of usual vulcanizing agents such as sulphur, or sulphur bearing compounds which provide sulphur under the vulcanizing conditions. Sulphur is the preferred vulcanizing agent and it is usually used in an amount of about 0.5 to 3 parts by weight per 100 parts by weight of the rubber. Zinc oxide and other metal oxides may be used in an amount of, for example, about 2 to 10 parts by weight per 100 parts by weight of rubber.

Conventional fillers and pigments may be formulated with the interpolymer, such as 10 to 400 parts by weight of carbon black, finely divided silica, esterified silica, titanium dioxide, kaolin and whiting, per 100 parts by weight of rubber. It is also possible to extend the inerpolymer with oil such as extender oils as represented by naphthenic oils usually added in an amount of 10 to 300 parts and preferably 20 to 80 parts per 100 parts by weight of rubber. However, it is a unique facet of this interpolymer that a great improvement over conventional EPDM polymers is evidenced from the standpoint of physical properties such as tensile, modulus, compression set, tear resistance, and aging, when the interpolymer curing formulation contains certain fillers. The preferred fillers are similar in that they contain functional groups which have active hydrogens, such as hydroxyl, carboxyl, primary and secondary amino and sulfhydryl groups. Typical fillers are hard clay, soft clay, Silene-D, Hi Sil-233, Zeolex-23, Silene E and the like. These preferred fillers can be used separately or in combination with each other or in combination with other fillers such as carbon black and other non-polar materials. The preferred fillers may also be used in combination with plasticizers and extender oils such as Shellflex 371-N, Circosol-4240 and the like.

Vulcanization is accomplished by heating the compounded interpolymer at a vulcanizing temperature for a period of time sufficient for vulcanization, such as at a temperature above 130° C. for 10 to 90 minutes, and preferably within the range of 160°-180° C. for about 30 minutes.

When carrying out a free radical cure of the interpolymer and compounds formed thereof, a heat activated free radical curing agent is admixed with the interpolymer and the mixture is heated to a sufficiently high temperature to activate the curing agent for cure over a practical period of time. Usually temperatures of 50° to 175° C. for a period of several minutes to several hours is sufficient. Preferred free radical curing agents include organic peroxides such as dicumene hydroperoxide, dibenzoyl hydroperoxide, cumene hydroperoxide and ditertiarybutylperoxide.

The uncured polymers of this invention may be used in a wide variety of mineral filler applications where the plastic homopolymers and copolymers of ethylene are generally used, such as wire coatings, toys, bottles and the like.

The cured polymers and compounds of this invention may be used in a wide variety of articles including tires, belts, hose, tubing and the like.

Having described the basic concepts of the invention, the following examples are given by way of illustration, but not by way of limitation, of the practice of the various concepts of this invention:

EXAMPLE 1

This example illustrates the preparation of an EPDM type interpolymer of the four-monomer component system representing the basic features of this invention and in which use is made of 5-trichlorosilyl-2-norbornene as representative of the second monomer, it being understood that others of the described silylnorbornenes, alkyl substituted halosilyl norbornenes or allyl and vinyl silanes may be used instead of the 5-trichlorosilyl-2-norbornenes.

A dry 7-ounce flask was flushed with nitrogen gas and containing 100 cc of dry hexane was fitted with a self-sealing syringe cap. The hexane was flushed with propylene and then pressured to 15 pounds per square inch with propylene. The flask was brought to 25 pounds total monomer pressure by addition from a feed tank containing 65 mole percent ethylene and 35 mole percent propylene. The polymerization was performed in a 35° C water bath. To the flask was added 0.02 mM of butyl perchlorocrotonate, 0.05 mM of trichlorosilyl norbornene, 0.15 mM of ethyl aluminum sesquichloride and 0.00375 mM of vanadium oxychloride. As the polymerization proceeded, the monomer composition was maintained constant by continual addition from the feed tank. At 300 and at 600 seconds, the above reactants were again charged to the flask. At 900 seconds the polymerization was stopped by treating the cement with one ml of water. Irganox 1010, a pentaerythritol ester having the general formula

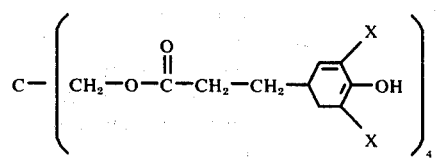

(an antioxidant of Geigy Chemical Company) was added and the polymer was recovered by steam coagulation. The resulting polymer (5.0 g) was extremely tough and did not press into a film in a Carver press at 180° C.

EXAMPLE 2

Example 1 was repeated except that the 5-trichlorosilyl-2-norbornene was substituted by an equivalent amount of a silane having the formula $R'SiR_nX_{3-n}$ in which $n$ is 1 or 2, $R'$ is a norbornenyl or an alkyl substituted norbornenyl of the type previously described and R is an alkyl or halogen substituted alkyl group such as methyl, ethyl, n-propyl, isopropyl, n-pentyl, trichloromethyl, 2,3-dibromopropyl, or trichloromethylpropyl, or an aryl, phenyl, or alkaryl or a halogen substituted arylphenyl or alkaryl group, as previously described.

The unsaturated silane, identified as the second monomer, is believed to enter into the interpolymerization reaction with the other monomers through the unsaturated carbon-to-carbon linkage of the organic group that is attached to the silicon atom. Under such circumstances, the organo silicon component, which forms a part of the interpolymer backbone molecule, continues to retain the 1 to 3 highly hydrolyzable groups, such as the chlorine, bromine, tertiary amino groups and the like. The highly hydrolyzable groups, present on the organo silicon segment of the interpolymer, remain hydrolyzable and highly reactive in the formed interpolymer.

The resulting interpolymer can be reacted in the presence of water or other aqueous medium to hydrolyze off one or all of the highly hydrolyzable groups to form the corresponding silanol of the interpolymer. The hydroxyl groups co-condense to cross-polymerize the interpolymer as will hereinafter be described.

To the present, the interpolymerization reaction for producing EPDM interpolymers is usually terminated when the solids reach about 8% by weight in the cement since polymerization to higher solids content or corresponding molecular weight or to higher molecular weight operates to render the cement too viscous for normal handling.

Further, if the interpolymer that is formed, in accordance with present conventional practice, has a relatively narrow range of molecular weight distribution, the elastomer is characterized by relatively poor processability, such as hot or cold mill processability, hot extrusion or the like. It is desirable then to be able to increase the solids content of the cement but without decrease in molecular weight and also to broaden the molecular weight distribution range to improve processability.

By the interpolymerization reaction of this invention, it becomes possible to increase both the solids content of the cement without decrease in average molecular weight while at the same time broaden the molecular weight distribution. This is achieved, in accordance with one ramification of this invention, by carrying out the polymerization with a greater number of polymerization nuclei to produce a cement having a larger number of interpolymers of loweraverage molecular weight. For example, by reaction to terminate interpolymerization when the molecules reach an average molecular weight about one-third the average molecular weight of the interpolymer normally produced, the reaction can be continued until the cement contains about 8 to 16 percent by weight polymer.

By killing the catalyst or simultaneous killing of the catalyst and coagulation of the polymer, with water, steam or other aqueous medium, the highly hydrolyzable groups are hydrolyzed off to form the corresponding silanol in which resulting hydroxyl groups are capable of reaction substantially immediately one with the other by condensation to form cross-linking Si-O-Si groups which, on the average, will operate to increase the molecular weight of the interpolymer formed of a silane having 2 to 3 highly hydrolyzable groups thereby to yield a cement having substantially the same amount of interpolymer of a higher average molecular weight and a much broader molecular weight distribution curve.

EXAMPLE 3

The reaction vessel was a one-gallon Sutherland reactor equipped with a high speed, heavy-duty, air driven motor; cooling coils, a thermometer; a temperature regulator; a pressure regulator; an injection port; and other openings where monomers, catalyst, and solvent were fed to the reactor. A tube dipping to the bottom of the reactor was present for the removal of the cement produced on a continuous basis. A vapor phase vent was provided to bleed off 10% of the gaseous monomer feed to prevent inert gas buildup.

The clean reactor was assembled, rinsed with dry hexane and purged overnight with dry nitrogen. In the morning the reactor bowl was heated with a flameless blowtorch and hot water was run through the coils until the temperature in the reactor was about 53° C. After this, propylene was flushed through the reactor for about 15 minutes; then the temperature was lowered to ambient and 2 liters of Esso chemical grade hexane, dried over 4A molecular sieves and stored over sodium, was added to the reactor. As the temperature was brought to 40° C, propylene was fed to the reactor through a 4A molecular sieve column until 39.2 inches Hg pressure was reached. The pressure was then brought up to 30 pounds with ethylene fed through a 4A molecular sieve column and 120 $\mu l$ pyridine and 3.4 mM 5-ethylidene-2-norbornene, and 2.6 cc of 1.5 M ethylaluminum sesquichloride were added.

The monomers were shut off and the catalysts, 0.20 molar ethylaluminum sesquichloride, 0.006 molar vanadium oxtrichloride at a 41 to 1 aluminum to vanadium ratio and 0.042 butyl perchlorocrotonate at a ratio of 7 butyl perchlorocrotonate per 1 vanadium were fed into the reactor at a constant rate until a drop in pressure in the reactor was noted. At this time the gaseous monomers were fed into the reactor through suitably calibrated rotometers at a rate of 3248 cc/minute, of which 1886 cc were ethylene and 1362 cc were propylene; the 0.21 mole 5-ethylidene-2-norbornene was added at 3.52 cc/minute; the norbornenyl trichlorosilane was added at 2 cc/minute to effect a level of 0.5 mM in the reactor, and pyridine was added at a rate of 2 cc/minute to effect a level of 1.4 mM/liter in the reactor. The polymerization was controlled by the catalyst pumps which added catalyst on demand as the pressure increased, thus maintaining the 30 pounds pressure throughout the run. When the solution became approximately 8% polymer, solvent containing 16 cc/cc ethylene was fed at the rate of 53 cc/minute into the reactor and the polymer cement taken off which produced about 220 g of polymer per hour.

At this time the ethylene and propylene feeds were adjusted to 1108 cc/minute and 2805 cc/minute to compensate for the unreacted monomers removed with the cement. In addition, 901 cc/minute of ethylene was added with the make-up solvent.

The solution cement, as removed from the reactor, was fed into a Waring Blender containing water where it was intimately mixed. The cement was then washed three times with equal volumes of water. The washed and stabilized cement, stabilized with 0.1 phr Irganox stabilizer based on the rubber, was fed with nitrogen pressure into a tee joint at the bottom of a 4-liter container full of hot circulating water. The other end of the tee is connected to a steam line and steam was admitted at such a rate as to superheat the rubber cement. The solvent and unreacted monomers were mostly removed by this procedure. The rubber crumb was collected on a screen, washed and chopped up in a Waring Blender. The rubber crumb was dried in the oven at 90° C. to remove any remaining solvent and water giving a rubbery copolymer which contained 67 mole % ethylene by infrared analysis, using the 720 cm$^{-1}$ absorbance for ethylene and the 968 cm$^{-1}$ absorbance for propylene, and had a viscosity of $ML_{1+8}$ = 63. The unsaturation expressed in C=C/1000 carbon atoms was 28.

The polymer was analyzed for unsaturation by the consumption of bromine correcting for the substitution reaction by a differential kinetic method based on the spectrophotometric method developed by Siggia et al., Anal. Chem. 35, 362 (1963). Curing of the dried rubber was effected by compounding in a Brabender plasticorder (or Banbury size B mixer), based on 100 parts of rubber, with 80 parts of semi-reinforcing carbon black, 20 parts of a naphthenic rubber processing oil, 5 parts of zinc oxide, 1 part of stearic acid, 0.75 parts of mercaptobenzothiazole, 1.5 parts of tetramethylthiuram sulfide, and 1.5 parts sulphur. Curing was for 30 minutes at 150° C. The cured properties as determined by standard ASTM methods D412-62T, D927-47, and D395-61-B are reported below.

The Hardness was determined on a Shore A duraometer. The belt life is the time in hours necessary for a 0.032" cut in a belt to grow to 5 times its original size when it is run on small pulleys in a chamber at 71° C. Heat rise ($\Delta T°$ F) is by the Goodrich method. Dispersion is a visual rating of the compounded stock. The slope of the cure curve was determined on a Monsanto rheometer.

EXAMPLE 4

Another run was carried out under conditions identical with those of Example 3 but with twice the amount of norbornenyl trichlorosilane.

The polymers of Examples 3 and 4 had the following characteristics but in which the polymer of Example 4 was extended with extender oil to the same Mooney number as the polymer of Example 3.

| Polymer | Parts oil | % ethylene | C=C/ 1000 C | $ML_{1+8}$* 250° F | $ML_{1+8}$** 250° F |
|---|---|---|---|---|---|
| Example 3 | 0 | 66 | 2.8 | 49 | 63 |
| Example 4 | 15.5 | 66 | 2.8 | 49 | 140 |

*The same polymer prepared without the silane
**The polymer as prepared in the examples with the silane The polymers of Examples 3 and 4 were compared with commercial polymers marketed by Copolymer Rubber & Chemical Corporation of Baton Rouge, Louisiana under the trade name EPsyn 70 having a Mooney $ML_{1+8}$ at 250° F of about 70, and EPsyn 40 having a Mooney $ML_{1+8}$ at 250° F of about 40. The polymers were formulated into standard black and mineral recipes and cured for determination of the resulting physical properties:

| Recipe | Black Formulation | EBsyn 70 | Example 3 |
|---|---|---|---|
| Polymer | | 100 | 100 |
| HAF Black | | 40 | 40 |
| Circoso. 4240 | | 10 | 10 |
| Zinc Oxide | | 5 | 5 |
| Stearic Acid | | 1 | 1 |
| Unads | | 1 | 1 |
| Sulfur | | 1 | 1 |
| Crude $ML_{1+8}$ (250° F) | | 70 | 63 |
| Compound $ML_{1+4}$ (212° F) | | 99 | 90 |
| Mooney Scorch (MS at 270° F) Minutes to a 3 Pt. Rise | | >30 | >30 |
| | Cure at 320° F | | |
| Tensile, psi | 10' | 3300 | 3200 |
| | 20' | 2375 | 2900 |
| | 30' | 2175 | 2400 |
| Elongation, % | | 760 | 820 |
| | | 510 | 580 |
| | | 430 | 460 |
| 300% Modulus, psi | | 550 | 475 |
| | | 950 | 875 |
| | | 1200 | 1100 |
| Hardness, Shore A | | 64 | 63 |
| | | 65 | 67 |
| | | 67 | 67 |
| Compression Set, % | | | |
| 22 Hrs. at 158° F | 25' | 23.5 | 21.9 |
| 22 Hrs. at 212° F | 25' | 57.4 | 55.7 |
| Rheometer Cure Rate units/min. | | | |
| (min.) | | 10.5 | 10.8 |
| $T_{90}$ | | 19.0 | 20.0 |
| Dispersion Rating | | 4.0 | 3.5 |

| Recipe | Mineral Formulation | Equal parts BRsyn 40 BPsyn 70 | Example 4 |
|---|---|---|---|
| Polymer | | 100 | 100 |
| Circosol 4240 | | 80 | 14.5 |
| Hard Clay | | 50 | 50 |
| Silene D | | 50 | 50 |
| Zinc Oxide | | 5 | 5 |
| Stearic Acid | | 1 | 1 |
| A-C Polyethylene 617 | | 10 | 10 |
| Diethylene Glycol | | 2 | 2 |
| Captax | | 1 | 1 |
| Sulfads | | 1 | 1 |
| Methyl Tuads | | 1.8 | 1.8 |
| Sulfur | | 2.5 | 2.5 |
| Crude $ML_{1+8}$ (250° F) | | 50 | 52 |
| Compound $ML_{1+4}$ (212° F) | | 63 | 68 |
| Mooney Scorch (MS at 250° F) (Minutes to a 5 Pt. Rise) | | 10.5 | 13.4 |
| | Cure at 320° F | | |
| Tensile, psi | 15' | 1275 | 1175 |
| | 20' | 975 | 1325 |
| Elongation, % | | 620 | 420 |
| | | 580 | 430 |
| 300% Modulus, psi | | 400 | 950 |
| | | 375 | 1025 |
| Hardness, Shore A | | 68 | 68 |
| | | 70 | 73 |
| Compression Set, % | | | |
| 70 Hrs. at 158° F | 30' | 73.2 | 68.2 |
| Garvey Die Extrusion | | | |
| Rate - gms./sec. | | 0.47 | 0.73 |
| Rate - ft./min. | | 1.19 | 1.84 |
| Appearance | | 7-B | 4-B |
| % Die Swell | | 40.25 | 40.0 |
| Specific Gravity | | 1.122 | 1.176 |
| Rheometer Cure Rate | | | |
| units/min. | | 11.2 | 15.0 |
| $T_{90}$ (min.) | | 16.75 | 15.5 |
| Oven Aged 70 Hrs. at 300° F | 15' | | |
| Tensile, % Change | | +17.5 | +61.2 |
| Elongation, % Change | | −48.4 | −52.5 |
| Dispersion Rating, | | | |

-continued

| Recipe | Mineral Formulation Equal parts BRsyn 40 BPsyn 70 | Example 4 |
|---|---|---|
| ASTM 2663 67-R | 4.5 | 3.5 |

| Recipe | Mineral Formulation EBsvn 70 | Example 3 |
|---|---|---|
| Polymer | 100 | 100 |
| Hard Clay | 50 | 50 |
| Silene D | 50 | 50 |
| Circosol 4240 | 30 | 30 |
| Zinc Oxide | 5 | 5 |
| Stearic Acid | 1 | 1 |
| A-C Polyethylene 617 | 10 | 10 |
| Diethylene Glycol | 2 | 2 |
| Captax | 1 | 1 |
| Sulfads | 1 | 1 |
| Methyl Tuads | 1.8 | 1.8 |
| Sulfur | 2.5 | 2.5 |
| Compound $MLC_{1+4}$ (212° F) | 74 | 74 |
| Mooney Scorch (MS at 250° F) | | |
| Minutes to a 5 Pt. Rise | 9.6 | 10.9 |
| Cure at 320° F | | |
| Tensile, psi   10' | 1125 | 1675 |
| 20' | 925 | 1375 |
| 30' | 850 | 1500 |
| Elongation, % | 620 | 590 |
| | 540 | 470 |
| | 480 | 450 |
| 300% Modulus, psi | 400 | 875 |
| | 450 | 950 |
| | 550 | 1075 |
| Hardness, Shore A | 69 | 71 |
| | 71 | 71 |
| | 73 | 72 |
| Compression Set, % | | |
| 70 Hrs. at 158° F   30' | 69.7 | 65.3 |
| 70 Hrs. at 212° F   30' | 88.5 | 88.8 |
| Rheometer Cure Rate units/min. | | |
| (min.) | 12.0 | 15.0 |
| $T_{90}$ | 17.0 | 15.5 |
| Dispersion Rating | 4.5 | 4.5 |

It will be seen that the polymer of Example 4, when compared with a 50/50 blend of EPsyn 70 and EPsyn 40, has better physical properties, a tighter cure and better scorch safety.

In the comparison of the polymer of Example 3 with EPsyn 70 in a mineral filled recipe, the polymer of Example 3 gave tensile and modulus values higher than EPsyn 70 with a slower cure and better scorch safety.

EXAMPLES 5

Another run is carried out under conditions identical with these of Example 3, but with no ethylidene norbornenes. The polymer of Example 5 30 is compared with commercial copolymer marketed by Copolymer Rubber and Chemical Corporation of Baton Rouge, Louisiana, under the trade name EPsyn 460, having a Mooney ML 1+8 of about 40 in a clay filled, peroxide cured formulation. The polymer from Example 5 gives improved physical properties such as higher tensile and modulus improved tear resistance.

When, as described in our copending application Ser. No. 546,933, filed Feb. 4, 1975, now abandoned, as a continuation of application Ser. No. 320,482, filed Jan. 2, 1973, the unsaturated organosilane, or its corresponding silanol, is a norbornenyl silane such as 7-isopropylidene-5-trichlorosilyl-2-norbornene, the polyunsaturated organo silicon component can be employed in the monomer mixture, as well as embodied in the interpolymer that is formed, in an amount up to 20% by weight of the total monomer and preferably in an amount within the range of 0.1 to 10% by weight, as illustrated by the following example, which corresponds to Example 5 of the aforementioned copending application:

EXAMPLE 6

A dry flask was first flushed with nitrogen gas and filled with 100 cc of dry hexane which was flushed with polymerization grade polypropylene and pressured to 15 psi with propylene. The flask was brought to 25 psi total pressure by addition from a feed tank containing 65 mole percent ethylene and 35 mole percent propylene. Polymerization was carried out in a water bath maintained at 35° C. Addition was made to the flask of the following reactants: 0.4 mM 5-ethylidene-2-norbornene, 0.3 mM of the adduct of dimethyl fulvene and vinyl-trichlorosilane, 0.03 mM butyl perchlorocrotonate, 0.04 mM pyridine, 0.3 mM ethyl aluminum sesquichloride, and 0.0075 mM vanadium oxythrichloride.

As the polymerization proceeded the monomer composition in ethylene and propylene was maintained constant by continuous additions from the feed tank. At 300 seconds again at 600 seconds, the above reactants were again charged to the flask and at 900 seconds, 0.3 cc of pyridine and 4 cc of methanol were added. After shaking for one hour, 0.05 g of Irganox 1010 was added. The flask was vented, the cement was coagulated with isopropanol, the polymer was redissolved in hexane, re-coagulated and dried.

In the foregoing example, the adduct may be identified as 7-isopropylidene-5-trichlorosilyl-2-norbornene.

The following is an example of the preparation of a liquid interpolymer of the four monomer groups embodying the features of this invention.

EXAMPLE 7

The reaction vessel was a one-gallon Sutherland reactor equipped with a high speed, heavy duty, air driven motor, cooling coils; a thermometer; a temperature regulator; a pressure regulator; an injection port; and other openings where monomers, catalyst, and solvent were fed to the reactor. A tube dipping to the bottom of the reactor was present for the removal of the cement produced on a continuous basis. A vapor phase vent was provided to bleed off 10% of the gaseous monomer feed to prevent inert gas buildup.

The clean reactor was assembled, rinsed with dry hexane, and purged overnight with dry nitrogen. In the morning, the reactor bowl was heated with a flameless blowtorch and hot water was run through the coils until the temperature in the reactor was about 70° C. After this, propylene was flushed through the reactor for about 15 minutes; then the temperature was lowered to ambient and two liters of Esso chemical grade hexane, dried over 4A molecular sieves and stored over sodium, was added to the reactor. As the temperature was brought to 45° C, propylene was fed to the reactor through a 4A molecular sieve column until 16 psig pressure was reached. The pressure was then brought up to 20 psig with ethylene fed through a 4A molecular sieve column and brought up to 31 psig with dry hydrogen; 60 µl of pyridene, 0.18 cc (1.36 mM) of 5-ethylidene-2-norbornene, 0.56 cc (2.52 mM) of 7-isopropylidenyl-5-trichlorosilyl-2-norbornene, and 2.6 cc of 1.5 M ethylaluminum sesquichloride were added.

The monomers were shut off and the catalysts (1.0 molar ethylaluminum sesquichloride and 0.03 molar vanadium oxytrichloride at a 40 to 1 aluminum to vanadium ratio, and 0.21 molar butyl perchlorocrotonate at a ratio of 7 to 1 perchlorocrotonate to vanadium ratio) were fed into the reactor at a constant rate until a drop in pressure in the reactor was noted. At this time, the gaseous monomers were fed into the reactor through suitability calibrated rotometers at a rate of 3450 cc per minute, of which 165 cc were hydrogen, 1260 cc were ethylene, and 2025 cc were propylene; the ethylidene norbornene was added as a 0.162 M solution in hexane at 3.75 cc/min. which provided about 2 C=C per 1000 C of unsaturation to the polymer; the 7-isopropylidenyl-5-trichlorosilyl-2-norbornene was added as a 0.248 M solution in hexane at 3.70 cc/minute which provided about 5.75 weight percent to be incorporated into the polymer. Pyridine was added as a solution in the ethylidene norbornene solution so that approximately 1 millimole/liter of pyridine was always present in the reaction. The polymerization was controlled by the catalyst pumps which added catalyst on demand as the pressure increased, thus maintaining the 31 psig throughout the run. When the solution became approximately 8% polymer, solvent containing 16 cc/cc ethylene was fed at the rate of 60 cc per minute into the reactor and the polymer cement taken off which produced about 241 g of polymer per hour.

At this time, the ethylene and propylene feeds were adjusted to 279 cc/minute and 3294 cc/minute to compensate for the unreacted monomers removed with the cement; the hydrogen feed remained unchanged.

The polymer cement, as removed from the reactor, was passed into a second stirred gallon Sutherland reactor so that for each liter of cement, 200 ml of methanol was present. After a residence period of 20 minutes, the cement was twice washed with methanol and the excess methanol decanted. The cement was placed in a rotary evaporator and antioxidant (Irganox 1010) added as a solution in toluene so that 0.1 weight % antioxidant would remain in the polymer after solvent removal. The flask was heated to 100° C and rotated while a vacuum was applied; the vacuum removed the hexane from the cement. The evaporation was continued for an additional 30 minutes after all bubble formation had ceased. The polymer was recovered as a honey colored liquid which was quite fluid at elevated temperatures.

Analysis showed that it contained 5 weight % 7-isopropylidenyl-5-trichlorosilyl-2-norbornane which had been converted to methoxyderivative and two carbon to carbon double bonds per 1000 carbon atoms (2.0 C=C/1000 C) unsaturation due to the ethylidene norbornene. The bulk viscosity of the product measured by a Brookfield viscometer was 15,000 poise at 23.5° C and had a reduced specific viscosity of 0.30.

Curing of the liquid polymer was effected by compounding in a Brabender Plasti-Corder. The recipe is based on 100 parts of polymer, 20 parts of fumed silica (Cab-O-Sil Ms-5), 10 parts zinc oxide, 2.5 parts titanium dioxide, and 4 parts dibutyltin diacetate. The polymer was placed on a waxed cardboard and allowed to cure at ambient temperature and 45–50% humidity for 7 days.

The cured properties of the polymer were determined and found to be comparable to those described below:

| | |
|---|---|
| Tensile strength, psi | 200 |
| Elongation, % | 135 |
| Tear (Die C), ppi | 25 |
| Hardness (Shore A) | 32 |

It will be apparent from the foregoing that we have provided a new and novel interpolymer and method for the preparation of same.

It will be understood that changes may be made in the details of formulation and operation without departing from the spirit of the invention, especially as defined in the following claims.

We claim:

1. An interpolymer which is the product of the interpolymerization in the presence of a Ziegler type catalyst of monomers consisting essentially of (1) ethylene, (2) a monoolefin having from 3 to 20 carbon atoms, (3) a polyene selected from the group consisting of an open chain polyunsaturated hydrocarbon having from 4 to 20 carbon atoms and a polyunsaturated bridged ring hydrocarbon, and (4) an ethylenically unsaturated organosilane having the general formula $R_nSiX_{4-n}$ in which X is a highly hydrolyzable group selected from the group consisting of a halogen and a tertiary amine, $n$ is an integer from 1 to 3, and R is a group selected from the group consisting of hydrogen, alkyl, aryl, alkaryl, arylalkyl, cyclic or heterocyclic group, in which at least one of the R groups is a norbornenyl group, in which the ethylene and monoolefin are present in the interpolymer in the mole ratio of 20-95 moles ethylene to 80-5 moles monoolefin, the polyene is chemically bound in the interpolymer in an amount within the range of 0.1 to 10 mole percent of the total number of moles of ethylene, monoolefin and polyene, and the unsaturated organosilane is present in the polymer in an amount of more than 0.01% but less than 1.0% by weight.

2. An interpolymer as claimed in claim 1 in which the ethylene and monoolefin are present in the interpolymer in the mole ratio of 45–90 moles ethylene to 55–10 moles of monoolefin.

3. An interpolymer as claimed in claim 1 in which the polyene is present in the interpolymer in an amount within the range of 0.1 to 3 mole percent.

4. An interpolymer as claimed in claim 1 in which the monoolefin is propylene.

5. An interpolymer as claimed in claim 1 in which interpolymerization is carried out in solvent solution in the presence of a Ziegler type catalyst.

6. An interpolymer as claimed in claim 1 in which the polyene is an alkylidene norbornene.

7. An interpolymer as claimed in claim 1 in which the polyene is 5-ethylidene-2-norbornene.

8. An interpolymer formed in the presence of a Ziegler type catalyst of monomers consisting essentially of ethylene, a monoolefin containing 3 to 20 carbon atoms, a polyene selected from the group consisting of an open chain polyunsaturated hydrocarbon containing 4 to 20 carbon atoms and a polyunsaturated bridged ring hydrocarbon, and an ethylenically unsaturated organosilane having the general formula $R_nSiX_{4-n}$ in which X is a highly hydrolzable group selected from the group consisting of a halogen and a tertiary amine, n is an integer from 1 to 3 and R is a group selected from the group consisting of hydrogen, alkyl, aryl, alkaryl, arylalkyl, cyclic or heterocyclic groups in which at least one of the R groups is a norbornenyl group, in which the ethylene and monoolefin are present in the interpolymer in the mole ratio of 20–95 moles ethylene to 80–5 moles monoolefin, the polyene is chemically bound in the interpolymer in an amount within the range of 0.1 to 10 mole percent of the total number of moles of ethylene, monoolefin and polyene, and the unsaturated organosilane is present in the interpolymer in an amount more than 0.01% but less than 1.0% by weight.

9. An interpolymer which is the product of the interpolymerizarion in the presence of a Ziegler type catalyst of monomers consisting essentially of (1) ethylene, (2) a monoolefin having from 3 to 20 carbon atoms, (3) a polyene selected from the group consisting of an open chain polyunsaturated hydrocarbon having from 4 to 20 carbon atoms and a polyunsaturated bridged ring hydrocarbon, and (4) a norbornenyl silane having the general formula $R_nSiX_{4-n}$ in which X is a highly hydrolyzable group selected from the group consisting of a halogen and a tertiary amine, n is an integer from 1 to 3 and R is a group selected from the group consisting of hydrogen, alkyl, aryl, alkaryl, arylalkyl, cyclic or heterocyclic group in which at least one of the R groups is a norbornenyl group, in which the ethylene and monoolefin are present in the interpolymer in the mole percent of 20–95 moles ethylene to 80-5 moles monoolefin, the polyene is chemically bound in the interpolymer in an amount within the range of 0.1 to 10 mole percent of the total number of moles of ethylene, monoolefin and polyene, and the norbornenyl silane is present in the polymer in an amount up to 20% by weight.

10. An interpolymer as claimed in claim 9 in which the norbornenyl silane is in the form of the corresponding silanol.

11. An interpolymer as claimed in claim 9 in which the norbornenyl silane is 7-isopropylidene-5-trichlorosilyl-2-norbornene.

12. An interpolymer as claimed in claim 11 in which the 7-isopropylidene-5-trichlorosilyl-2-norbornene is present in the interpolymer in an amount within the range of 0.05 to 20% by weight.

13. An interpolymer as claimed in claim 11 in which the 7-isopropylidene-5-trichlorosilyl-2-norbornene is present in the interpolymer in an amount within the range of 0.1 to 10% by weight.

14. An interpolymer as claimed in claim 9 in which the monoolefin is propylene.

15. An interpolymer as claimed in claim 9 in which the polyene is an alkylidene norbornene.

16. An interpolymer as claimed in claim 9 in which the polyene is 5-ethylidene-2-norbornene.

* * * * *